No. 661,207. Patented Nov. 6, 1900.
H. G. CARTER.
CREAM SEPARATOR.
(Application filed Aug. 20, 1900.)
(No Model.)
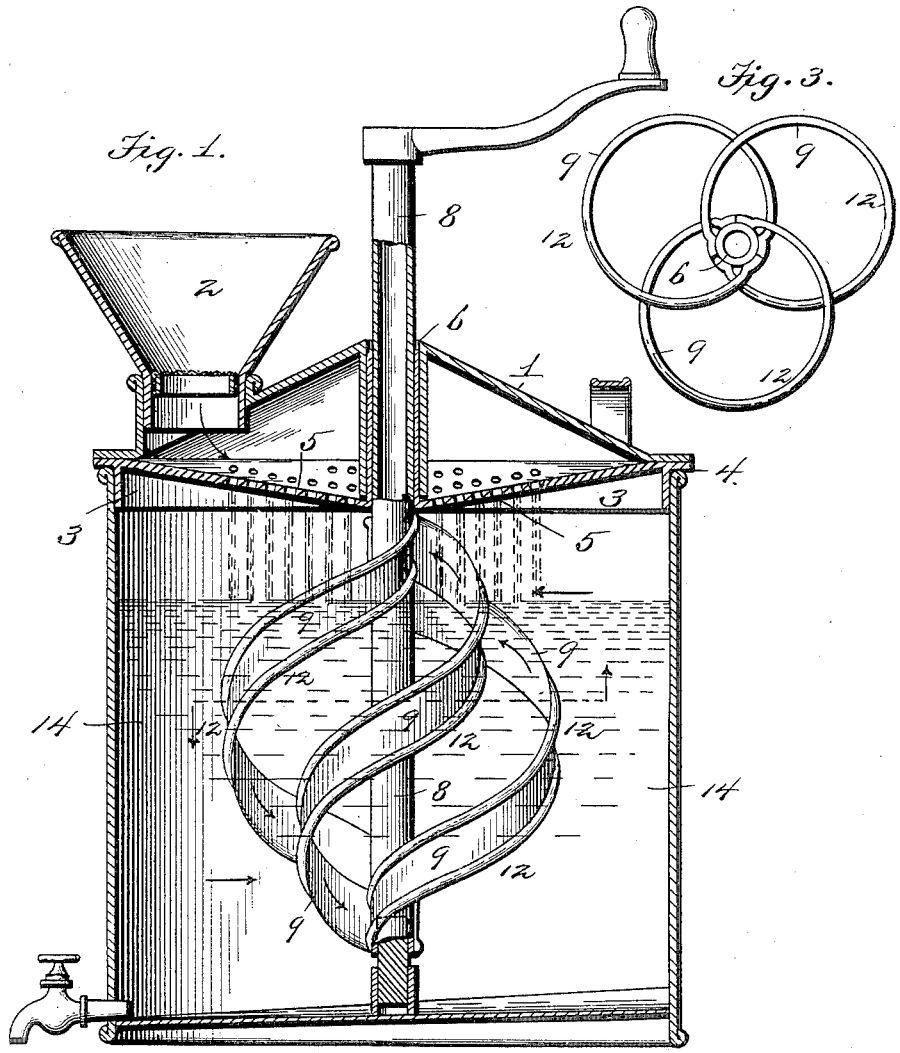
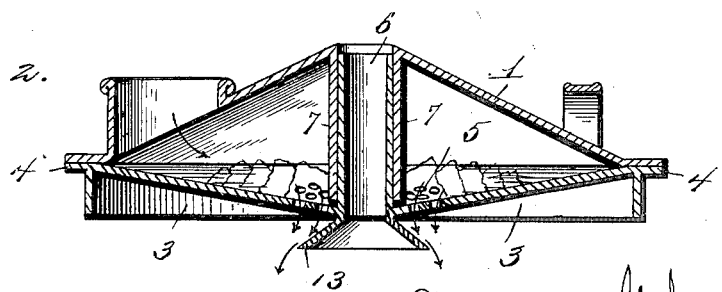

UNITED STATES PATENT OFFICE.

HOWARD G. CARTER, OF OAK HILL, PENNSYLVANIA.

CREAM-SEPARATOR.

SPECIFICATION forming part of Letters Patent No. 661,207, dated November 6, 1900.

Application filed August 20, 1900. Serial No. 27,457. (No model.)

*To all whom it may concern:*

Be it known that I, HOWARD G. CARTER, a citizen of the United States, residing at Oak Hill, in the county of Lancaster and State of Pennsylvania, have invented certain new and useful Improvements in Cream-Separators, of which the following is a specification.

The improvement herein is directed to the production of a self-creamer in which the separation of the cream from the milk is facilitated and rendered effective by the quick mechanical mixture of cold water with the milk. For this purpose I have designed a rotary mixing-scroll, which I find quickly gives the desired mixing as the cold water is rained upon the surface of the milk, and thereby caused to be dissipated through the body of the milk, facilitating the separation of the cream and the settling of the water and milk therefrom. In this mixing the scroll has no dasher action or churning effect, but a lifting and a depressing action on the fluid as the scroll is turned to the right or to the left and in which the edges of the scrolls have a roll-like action upon the milk. The raining of cold water is rendered uniform by providing a cover which has a dish-shaped perforated bottom in which the perforations are large enough to rain the water in streams upon the mixer and which will penetrate the surface of the milk while the mixer is being rotated. The cover is made with the perforated bottom separable, so that ice may be placed upon it and the parts may be easily kept clean.

The drawings illustrate my improvement, in which—

Figure 1 shows the creaming-can, its mixing-scroll, and the perforated cover for raining streams of cold water into the milk while the scroll is being rotated. Fig. 2 shows a modification of the perforated cover, from which the water has a deflected flow from the center upon the surface; and Fig. 3 shows the scroll in end view to illustrate the ring projection of the scroll-blades at the side of the shaft.

The can may be a vessel of any suitable kind and is provided with a faucet, through which the contents are drawn off, the outflow being facilitated by a bottom channel.

The cover is made of two separable conical parts fitted together at their bases, both parts having a central opening, through which passes and has its bearing the shaft of a scroll-mixer. The upper part of the cover 1 has a funnel 2, which may also form a filter through which the milk and cold water are poured into the can, while the lower part 3 has the joint-forming cover-rim 4 for resting upon the edge of the can and a perforated bottom 5, through which cold water poured through the funnel is rained in streams upon rotating scroll and surface of the milk. Both cover parts may have central tubes 6 7 telescoping and this is advantageous in keeping the top part by its tube 7 in joint-forming seating upon the lower part.

The mixer consists of a shaft 8, stepped in a central bearing, its crank-handle end supported by the cover tubular bearing, and scroll-blades 9, each being so formed that viewed from the end of the shaft mixer-blades present rings on the sides thereof, as seen in Fig. 3. The curved ends of each scroll-blade are secured to the shaft and they have a sort of cyma-reversa curve which gives the ring form standing at the side of the shaft. The meeting of the blades in curves at the shaft is important to avoid a dasher action and to give a wave-like lifting action on the liquid in turning the shaft to the right and a wave-like downward action on the liquid in turning the shaft to the left, and this reverse action on the liquid is from about mediately of the length of the blades. This is important to cause a comparatively gentle mixing through the body, so that the cold water will be quickly incorporated with the warm milk. This mixing action, while raining cold water at the same time on the surface of the wave-like body, brings into quick effect the coldness of the water throughout the body of the milk, and this is what hastens the separation of the fatty particles and produces with the water skim-milk, the settling of which is much more complete and uniform than can possibly be obtained by a still coldness of metal surfaces or by a still coldness of the slow and imperfect penetration of the water through the body of the milk. For contributing to the non-breaking or non-bursting action of the scroll on the butter-containing globules I make the edges 12 of the scroll-blades rolling or convex ridges, so that they have only a pushing or displacing action on the milk in their rotation. There are no sharp edges or cross-arms or ridges in the mixer, that would give a dashing, breaking, or violent agitation to the milk. On the rapidity of the completeness of the mixture depends the complete separation of the fatty particles of the cream from the milk, and carrying out this idea the mixing is best effected while the cold water is being poured into the milk and on the surface of the milk, because thereby the function of the mixer is made more effective in the dissemination of the cold water, so as to bring the liquid to a uniform temperature of about 60°. The rotation of the scroll is preferably only while pouring in the cold water and which is best poured in comparatively slowly with a comparatively rapid rotation of the scroll, after which the mixer is removed, and the settling will take about an hour, leaving the skim-milk and water at the bottom of the can to be first drawn off. For use in the ordinary-size creamery-can I prefer to make the scroll-blades about an inch wide, so as to give surface for the mixing motion to the milk.

I prefer to make the supporting-bearing of the shaft of hard wood and secure it as a plug in the shaft, which makes it convenient to renew the bearing-plug.

The conical bottom of the lower cover part stands downward, and the perforations are preferably made to deliver the water around the top of the scroll, and the perforations for this purpose need be only in the cover-bottom around the central tube. The water, however, may be delivered from the perforations upon a conical shed 13, from the edge of which it is delivered in a sort of cylindrical sheet over and upon the end of the scroll, as indicated by the arrows in Fig. 2.

It will be noted that the scroll-mixer has three blades, each curving from its connected end so as to form a ring viewed in the axis line of the curve standing at one side of the shaft, and it is this form that gives a lifting action of the scroll upon the milk from a mediate line 14 when turned to the right and a downward action of the scroll from such line upon the milk when rotated to the left.

The cover may be removed and the milk poured first directly into the can. The placing of ice upon the perforated bottom has the effect of retarding the outflow of the water through the perforations to give it the desired coolness.

The can may be provided with the usual sight-panels, and while I prefer the conical perforated bottom, as concentrating the raining of the water on the scroll and upon the surface of the milk around the shaft, yet the raining-surface of any suitable cup form around the shaft may be used.

I claim—

A cream-separator consisting of a can, a cover therefor formed of a concave bottom, a central tube rising therefrom, an imperforate conical shed flaring from the inner end of said tube below the bottom, perforations in the latter above the shed and a separate imperforate conical top part seated upon the concave part having a depending tube telescoping with the bottom tube, an opening at one side of the tube, and a shaft passing through the depending conical shed and the cover-tubes, having mixing-scrolls whereby cold water is rained from the cover in streams and from the conical shed in a shed upon the scrolls to effect its quick and uniform mixing with the cream.

In testimony whereof I affix my signature in presence of two witnesses.

HOWARD G. CARTER.

Witnesses:
D. M. TAYLOR,
D. A. STUBBS.